(No Model.)

J. W. SANBORN.
EYEGLASS CASE.

No. 438,363. Patented Oct. 14, 1890.

WITNESSES.

INVENTOR.

UNITED STATES PATENT OFFICE.

JOHN WALTER SANBORN, OF QUINCY, MASSACHUSETTS.

EYEGLASS-CASE.

SPECIFICATION forming part of Letters Patent No. 438,363, dated October 14, 1890.

Application filed March 14, 1890. Serial No. 343,938. (No model.)

*To all whom it may concern:*

Be it known that I, JOHN WALTER SANBORN, a citizen of the United States, residing at Quincy, in the county of Norfolk and State of Massachusetts, have invented certain new and useful Improvements in Eyeglass-Cases; and I do hereby declare the following to be a full, clear, and exact description of the invention, such as will enable others skilled in the art to which it appertains to make and use the same.

My invention relates to improvements in eyeglass-cases; and the object of my improvements is to make one case answer for any size of offset eyeglasses between the nose-pieces. The block projection now in use and glued to the flat leaf of the case cannot be adapted to different widths between the nose-pieces of the eyeglass, as four sizes of blocks have to be made for the different widths, and more are needed in order that the spring and nose-pieces should be kept in their desired shape and position. The block, being only glued to the flat leaf of the case, is apt to come off, and as it has to be covered with the same material as the lining of the case it is much more expensive and takes more time and material than by my improvement. Instead of a block projection I use a metallic skeleton projection with radiating arms, having prongs at the end of the arms to be inserted into the lining of the case, which projection will serve for any size of eyeglass as to width between the nose-pieces. It is not necessary to keep the glasses just in position in the case in my device that the spring or nose-piece of the eyeglass should clasp the projection. The eyeglass may be placed over the projection and be allowed motion laterally.

Figure 1:
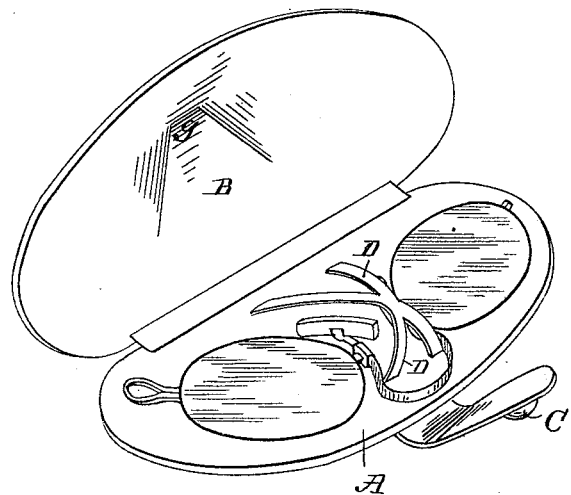
Figure 2:
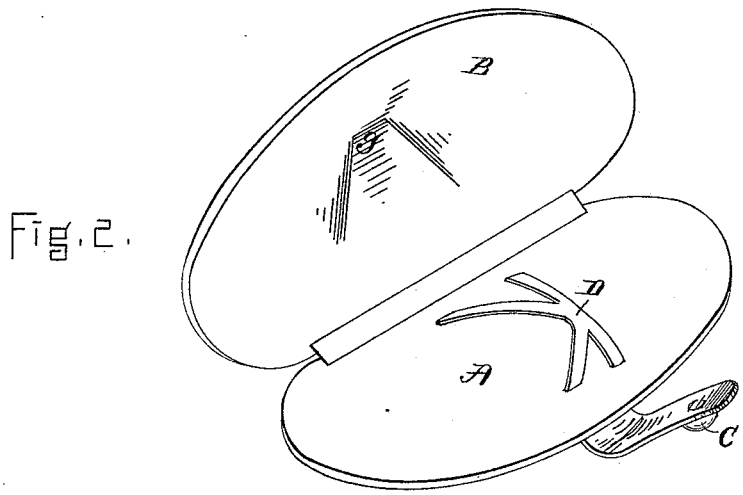
Figure 3:
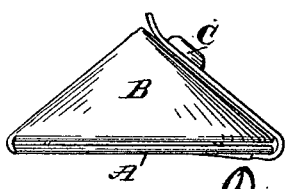

In the drawings, Figure 1 is a perspective view of the case open, showing the glasses in position. Fig. 2 is a perspective view of the case open, with the glasses removed. Fig. 3 is a side elevation of the case closed.

A is the flat leaf of the case, with the skeleton metallic projection with radiating arms D.

B is the concave leaf, conical-shaped, the skeleton projection resting in the concavity inside $g$ when the case is closed.

C is the ball-and-socket device and strap for fastening the case together.

I make my skeleton projection of German silver, white metal, or other suitable material, and with prongs or points at the end of each arm to be bent or inserted in the lining of the case, which fastens the device effectually. The method of fastening now in use with strap does not keep the case closed, and I have found it necessary to use a ball-and-socket device and strap to fasten the case.

I make my skeleton metallic projection in a die, thus producing my device quicker and cheaper than the old wooden-block projection. The ball-and-socket lock is also supported by the skeleton projection inside.

Having described my invention, what I claim is—

1. The herein-described eyeglass-case, consisting of the two leaves hinged together, one of said leaves being provided with a central metallic skeleton projection with radiating arms, and prongs or points over which the eyeglass is to be placed, all arranged as and for the purpose set forth.

2. The herein-described case for eyeglasses, consisting of the flat leaf A, having the central metallic skeleton projection with radiating arms and prongs or points D therein, and the concave leaf B, hinged to leaf A, with the concavity $g$ therein, all arranged as and for the purpose set forth.

3. A pocket-case for the protection of eyeglasses, consisting of two leaves hinged together and adapted to close flatly without overlapping or interlocking at the periphery, one of said leaves provided with a central skeleton projection with radiating arms and prongs over which the glass is to be placed, as described, with a ball-and-socket-and-strap locking device C on the case, arranged and constructed as and for the purpose set forth.

In testimony whereof I affix my signature in presence of two witnesses.

JOHN WALTER SANBORN.

Witnesses:
GEORGE E. BETTON,
DAVID C. HENNESSY.